US009268019B2

(12) United States Patent
Bunch et al.

(10) Patent No.: US 9,268,019 B2
(45) Date of Patent: Feb. 23, 2016

(54) SYSTEM AND METHOD OF DISPLAYING CONVECTIVE WEATHER ON A WEATHER RADAR DISPLAY

(71) Applicant: Honeywell International Inc., Morristown, NJ (US)

(72) Inventors: Brian Paul Bunch, Snohomish, WA (US); Paul Christianson, Seattle, WA (US); Robert J. Jensen, Renton, WA (US)

(73) Assignee: Honeywell International Inc., Morris Plains, NJ (US)

( * ) Notice: Subject to any disclaimer, the term of this patent is extended or adjusted under 35 U.S.C. 154(b) by 288 days.

(21) Appl. No.: 13/910,652

(22) Filed: Jun. 5, 2013

(65) Prior Publication Data

US 2014/0361923 A1    Dec. 11, 2014

(51) Int. Cl.
*G01S 13/95* (2006.01)
*G01S 7/04* (2006.01)
(Continued)

(52) U.S. Cl.
CPC ............... *G01S 13/953* (2013.01); *G01C 23/00* (2013.01); *G01S 7/062* (2013.01); *G01S 7/22* (2013.01);
(Continued)

(58) Field of Classification Search
CPC ............... G01S 7/02; G01S 7/04; G01S 7/06; G01S 7/062; G01S 7/22; G01S 13/88; G01S 13/95; G01S 13/953; G08G 5/0017; G08G 5/0021; G08G 5/0073; G08G 5/91; G08G 5/0091; G01C 23/00; G01W 1/00; G01W 2001/003

USPC ...... 342/26 R–26 D, 175, 176, 179–184, 195, 342/89–93; 340/945, 971
See application file for complete search history.

(56) References Cited

U.S. PATENT DOCUMENTS 4,347,618 A * 8/1982 Kavouras et al. ........... 342/26 D
4,649,388 A * 3/1987 Atlas .......................... 342/26 D
(Continued)

FOREIGN PATENT DOCUMENTS

EP    2078967 A1    7/2009

OTHER PUBLICATIONS

Response to Search Report dated Jan. 8, 2015, from Counterpart European Patent Application No. 14168755.8, dated Mar. 12, 2015, 15 pp.
(Continued)

*Primary Examiner* — Bernarr Gregory
(74) *Attorney, Agent, or Firm* — Shumaker & Sieffert, P.A.

(57) ABSTRACT

A convective weather graphic element generator system generates graphic elements associated with severe convective weather for presentation on a display on an aircraft. An exemplary system employs a weather radar and a processing system. The processing system determines a value associated with the detected convective weather based on the received weather radar returns detected by the weather radar, compares the value associated with the detected convective weather with a threshold, and generates a graphic element for a region of airspace when the value associated with the detected convective weather exceeds the threshold. The display is configured to concurrently present the weather reflectivity information generated by the weather radar and the graphic element associated with the convective weather, wherein portions of both the presented graphic element and the presented weather reflectivity information of the corresponding area are concurrently visible on the display.

20 Claims, 3 Drawing Sheets

(51) Int. Cl.
  *G01C 23/00* (2006.01)
  *G01W 1/00* (2006.01)
  *G01S 7/06* (2006.01)
  *G01S 7/22* (2006.01)
  *G01S 13/00* (2006.01)
  *G08G 5/00* (2006.01)

(52) U.S. Cl.
  CPC ........... *G01W 1/00* (2013.01); *G01W 2001/003* (2013.01); *G08G 5/0021* (2013.01); *G08G 5/0091* (2013.01)

(56) References Cited

U.S. PATENT DOCUMENTS

| | | | |
|---|---|---|---|
| 6,741,203 B1 * | 5/2004 | Woodell | 342/26 B |
| 6,879,280 B1 * | 4/2005 | Bull et al. | 342/26 B |
| 6,920,233 B2 * | 7/2005 | Wolfson et al. | 342/26 R |
| 7,109,913 B1 * | 9/2006 | Paramore et al. | 342/26 B |
| 7,161,525 B1 * | 1/2007 | Finley et al. | 342/26 R |
| 7,292,178 B1 * | 11/2007 | Woodell et al. | 342/26 B |
| 7,656,343 B1 * | 2/2010 | Hagen et al. | 342/26 B |
| 8,068,050 B2 | 11/2011 | Christianson | |
| 8,410,977 B2 | 4/2013 | Rowen et al. | |
| 8,665,133 B2 * | 3/2014 | Khatwa et al. | 342/26 B |
| 9,019,146 B1 * | 4/2015 | Finley et al. | 342/26 B |
| 2010/0245165 A1 | 9/2010 | Kauffman et al. | |

OTHER PUBLICATIONS

Extended Search Report from counterpart European Patent Application No. 14168755.8, dated Nov. 24, 2014, 7 pp.

* cited by examiner

SYSTEM AND METHOD OF DISPLAYING CONVECTIVE WEATHER ON A WEATHER RADAR DISPLAY

BACKGROUND OF THE INVENTION

Current state-of-the-art commercial airborne weather radar systems typically provide display of the following information: Weather Reflectivity, Ground Reflectivity, and optionally, Turbulence. The displayed information is determined from radar returns (radar signal reflections from incident radar signals emitted by the aircraft weather radar system).

Weather reflectivity is essentially a measure of the "percentage" of a reflected radar signal returned back to the radar receiver onboard the aircraft. Weather reflectivity information provides an approximate indication of rainfall rate when the radar signal is incident on weather in proximity to the aircraft. The weather reflectivity information is usually graphically displayed on a display of the radar system as areas of green, areas of yellow, and/or areas of red, where the green, yellow and red colors correspond to increasing levels of reflectivity. For instance, the crew of an installation aircraft may understand that an area shown as a green colored area of reflectivity indicates a light level of precipitation (that is presumably safe to fly through). The crew understands that another area shown as a yellow colored area of reflectivity indicates a higher level of precipitation that, although safe to fly through, will have noticeable levels of precipitation. And, the crew understands that an area shown as red colored area of reflectivity indicates a high level of precipitation (that the aircraft should be flown around if possible). Other colors may be used, such as magenta or the like, to indicate levels of severity with higher granularity.

Ground reflectivity may also be a measure of the percentage of a returned radar signal of the ground. However, the particular value of the ground reflectivity information does not correspond to particular aviation-operationally relevant characteristics, other than, for example, to provide a distinction between land masses and large bodies of water.

Broadly defined, turbulence is random or chaotic motion. In the context of aviation, turbulence generally relates to random motion of air. More precisely, the presence of turbulence means that the velocity of air in a region of interest is not correlated spatially. That is, non-turbulent (smooth or laminar flow) air has the characteristic that the velocity vector (magnitude and direction) of the air, for the most part, is the same over a large volume. In contrast, turbulent air is characterized by a high degree of variation in wind speed over relatively short length scales (i.e., the velocity vectors in the wind field at two points of a relatively small displacement are not correlated). If turbulence information is presented on the display, such information is typically inferred from various characteristics of the returned radar reflections and/or may be based on Doppler information contained in the return signals.

Figure 1:
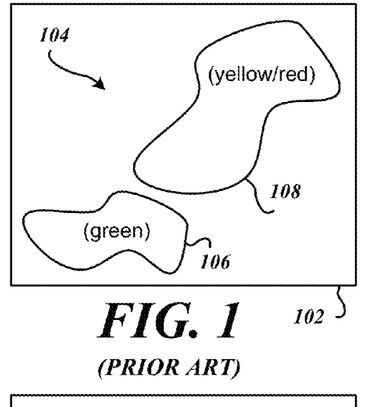
FIG. 1 is a conceptual illustration of a portion of a weather radar display showing hypothetical weather reflectivity information obtained by a conventional weather radar system.

FIG. 1 is a conceptual illustration of a portion of a weather radar display 102 showing hypothetical weather reflectivity information 104 obtained by a conventional weather radar system onboard an aircraft. Here, two regions of weather, or weather cells, are indicated on the portions of the weather radar display 102. A first weather cell graphic element 106 is shown on the display 102 using a green color (conceptually denoted with the "green" text shown thereon) to indicate the location of a first weather cell. A second weather cell graphic element 108 is shown on the display 102 using a red or yellow color (conceptually denoted with the "yellow/red" text shown thereon) to indicate the location of a second weather cell.

The first weather cell graphic element 106, for discussion purposes, is understood by the crew to be associated with stratiform weather. Stratiform weather is characterized by relatively low amounts of water volume, low vertical air velocities, and/or relatively low circulation confined to a small band of altitudes. Often, stratiform weather is generated by a slow, steady air mass lifting process, either orographically or by one air mass lifting another. Stratiform weather can also result as outflow from convective weather. The radar signal reflectivity level of stratiform weather is relatively low. This low level of radar signal reflectivity may be indicated using a green color in the hypothetical example illustrated in FIG. 1.

The second weather cell graphic element 108, for discussion purposes, is understood by the crew to be associated with convective weather. Convective weather is characterized by significant lifting and circulation of air (i.e., significant updrafts and down drafts) existing over a relatively large band of altitudes. Convective weather may be associated with several hazards including turbulence, lightning, and/or hail. Also, convective weather is typically associated with a relatively high water content. Accordingly, the radar signal reflectivity level from convective weather is relatively high. This higher level of radar signal reflectivity may be indicated using a yellow and/or red color in the hypothetical example illustrated in FIG. 1.

SUMMARY OF THE INVENTION

A convective weather graphic element generator system generates graphic elements associated with severe convective weather for presentation on a display on an aircraft. An exemplary system employs a weather radar and a processing system. The processing system determines a value associated with the detected convective weather based on the received weather radar returns detected by the weather radar, compares the value associated with the detected convective weather with a threshold, and generates a graphic element for a region of airspace when the value associated with the detected convective weather exceeds the threshold. The display is configured to concurrently present the weather reflectivity information generated by the weather radar and the graphic element associated with the convective weather, wherein portions of both the presented graphic element and the presented weather reflectivity information of the corresponding area are concurrently visible on the display.

BRIEF DESCRIPTION OF THE DRAWINGS

Preferred and alternative embodiments of the present invention are described in detail below, with reference to the following drawings.

DETAILED DESCRIPTION OF THE INVENTION

The present invention, a convective weather graphic element generator, provides systems and methods for displaying areas corresponding to convective weather on a weather radar display 102. FIGS. 2A-2K are conceptual illustrations of unique graphic elements that are generated by various embodiments of the convective weather graphic element generator 200. The unique graphic elements are superimposed over the weather information presented on the weather radar display 102 such that the unique graphic elements indicate the locations of relatively severe convective weather. Accordingly, portions of both the presented graphic elements and the presented weather reflectivity information of the corresponding area are concurrently visible on the display.

Various embodiments use one or more unique graphic elements that are superimposed over the weather information presented on the weather radar display 102. The unique graphic elements are readily recognizable by the crew of the aircraft as an indication of more severe levels of convective weather. Further, the unique graphic elements are readily discernable (noticeable) by the crew such that the crew quickly understands the location and potential hazard of detected convective weather that is indicated by the unique graphic elements presented on the weather radar display 102.

Figure 2A:
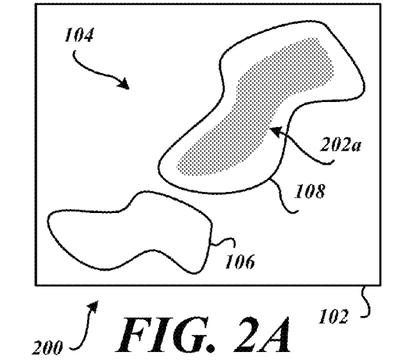
FIGS. 2A-2K are conceptual illustrations of unique graphic elements that are superimposed over the weather information presented on the weather radar display, wherein the unique graphic elements indicate the location of relatively severe convective weather.

FIG. 2A illustrates an example embodiment that presents the unique graphic element 202a using a solid colored region. Here, the graphic element 202a is superimposed over the second weather cell graphic element 108 associated with the second convective weather cell. The extent of the colored region of the graphic element 202a indicates the location and extent of the relatively severe convective weather with respect to the aircraft.

For illustration purposes, the color of the graphic element 202a is illustrated as grey. However, embodiments may employ any color of interest. For example, a red color may be used to present the graphic element 202a to indicate that the particular region of airspace associated with the graphic element 202a is potentially hazardous and should be avoided. Other colors may be used to indicate various levels of severity of the convective weather. For example, a yellow color may indicate cautionary condition to the crew, such that if the aircraft is flown through the convective weather indicated by the graphic element 202a, a level of caution should be observed by the crew and/or that additional safety measures should be taken. As another example, a green color may indicate a relatively safe flying condition to the crew, such that if the aircraft is flown through the convective weather indicated by the graphic element 202a, a reasonable level of caution should be observed by the crew.

Further, the graphic element 202a may be presented using any desired level of intensity. In some embodiments, the level of intensity of the presented graphic element 202a may be increased with increasing levels of determined severity of the convective weather.

Additionally, or alternatively, the graphic element 202a may be presented in a flashing manner to heighten visible awareness to the crew. That is, the flashing of the graphic element 202a may more readily catch the attention of the crew to indicate a potentially threatening region of convective weather. Further, portions of both the presented graphic element and the presented weather reflectivity information of the corresponding area are then concurrently visible on the display. In some embodiments, the rate of flashing may be associated with the determined severity of the convective weather. For example, a higher flashing rate (faster flashing) may be associated with relatively more severe convective weather.

The extent of the graphic element 202a indicates the bounds of the relatively severe convective weather. For example, the region of airspace indicated by the graphic element 202a is smaller that the bounds of the presented second weather cell graphic element 108. Here, the crew intuitively understands that the more severe portions of the second weather cell indicated by the second weather cell graphic element 108 lie inside of the second weather cell. The boundary of the presented graphic element 202a further imparts information to the crew regarding the extent and location of the more severe convective weather of the second weather cell.

Embodiments illustrated in FIGS. 2B-2K present other types of graphic elements which are used to indicate identified regions of convective weather of interest. As with the graphic element 202a, these alternative unique graphic elements may use any suitable color, intensity, and/or flashing to impart information about the associated convective weather. Alternatively, or additionally, the alternative unique graphic elements of FIGS. 2B-2K may use a flashing of the graphic element to heighten awareness of the crew.

Figure 2B:
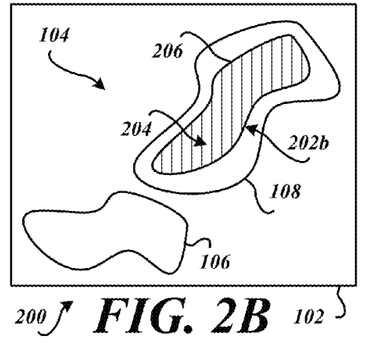

FIG. 2B illustrates an example embodiment that presents the unique graphic element 202b using a pattern 204 of lines and a boundary line 206. Here, the graphic element 202b is superimposed over the second weather cell graphic element 108 associated with the second convective weather cell. Accordingly, portions of both the presented graphic element 202b and the presented weather reflectivity information of the corresponding area are concurrently visible on the display 102.

The extent of the graphic element 202b is defined by the boundary line 206. The boundary line 206 indicates the location and the extent of the relatively severe convective weather with respect to the aircraft. Any suitable format of the presented boundary line 206 may be used, such as bold lines, thicker lines, thinner lines, dotted lines, dashed lines, or the like. Alternatively, or additionally, the format of the lines of the boundary line 206 may be modified to indicate relative severity of the convective weather. For example, but not limited to, a bold and/or thicker boundary line 206 may be associated with more severe convective weather. Optionally, the color, intensity, and/or flashing of the boundary line 206 may be associated with levels of severity of the convective weather (similar to the differing colors used to present the above-described graphic element 202a of FIG. 2A).

The pattern 204 is used to more clearly identify the interior region of the convective weather bounded by the boundary line 206. The pattern 204 permits portions of the conventional presentation of the reflectivity information to remain visible on the display 102. That is, the vertical lines of the pattern 204 readily indicate the region of convective weather of interest, and the space between the pattern lines permits continued presentation of the conventional weather information. That is, portions of both the presented graphic element and the presented weather reflectivity information of the corresponding area are concurrently visible on the display 102. Any suitable format of the presented pattern 204 may be used, such as cross hatched lines, angled lines, or the like. Alternatively, or additionally, the format of the presented pattern 204 may be modified to indicate relative severity of the convective weather. For example, but not limited to, a bold and/or thicker pattern lines may be associated with more severe convective weather. Optionally, the color, intensity, and/or flashing of the pattern may be associated with levels of severity of the convective weather (similar to the colors used to present the above-described graphic element 202a of FIG. 2A).

Figure 2C:
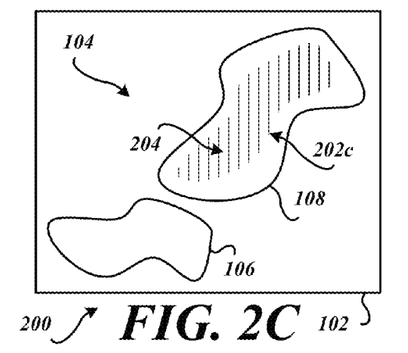

FIG. 2C illustrates an example embodiment that presents the unique graphic element 202c using only the pattern 204 of lines superimposed over the second weather cell graphic element 108 associated with the second convective weather cell.

Here, the boundary line 206 of FIG. 2B is omitted. The graphic element 202*c* may be presented in any suitable manner.

In some embodiments, the omission of the boundary line 206 of FIG. 2B may be used to impart information to the crew. For example, if the region of area of the pattern 204 is relatively less severe in nature, the boundary line 206 may be omitted. Then, if the boundary line appears (the transitioning to presentation of the graphic element 202*b* of FIG. 2B), the crew may appreciate that the characteristics of the second weather cell are changing.

Figure 2D:
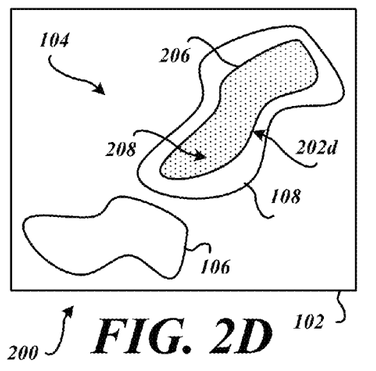
Figure 2E:
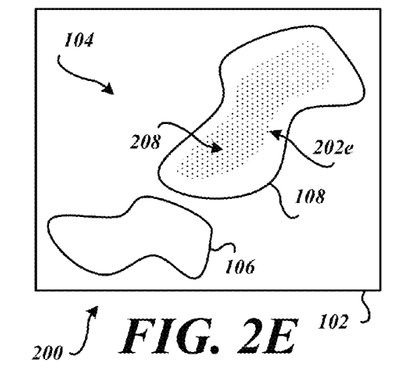

FIG. 2D illustrates an example embodiment that presents the unique graphic element 202*d* using a pattern 208 of dots and a boundary line 206. FIG. 2E illustrates an example embodiment that presents the unique graphic element 202*e* using only the pattern 208 of dots. Here, the graphic elements 202*d*, 202*e* are superimposed over the second weather cell graphic element 108 associated with the second convective weather cell. Accordingly, portions of both the presented elements 202*d*, 202*e* and the presented weather reflectivity information of the corresponding area are concurrently visible on the display 102.

Characteristics of the presented pattern 208 of dots may be optionally used to impart additional information about the characteristics of the convective weather of interest. For example, larger dots may be used to indicate increasing levels of severity of the convective weather of interest, as contrasted with smaller dots that are associated with lesser levels of severity of the convective weather of interest. Alternatively, or additionally, a decreased spacing between dots may be used to indicate increasing levels of severity of the convective weather of interest, as contrasted with a farther spacing of dots that are associated with lesser levels of severity of the convective weather of interest. Colors, intensity, and/or flashing of the dots may also be used to indicate increasing levels of severity of the convective weather of interest. For example, yellow dots may indicate a need for caution and a red color may indicate a warning or alert condition. Increasing intensity and/or faster flashing rates may be associated with increasing levels of severity of the convective weather.

Figure 2F:
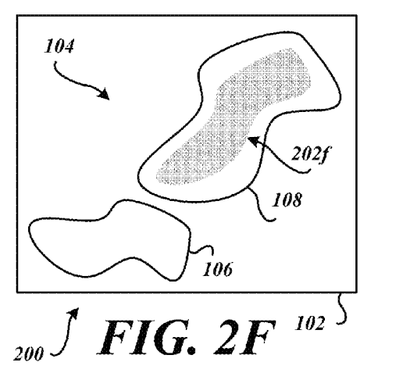

FIG. 2F illustrates an example embodiment that presents the unique graphic element 202*f* using a degree of transparency and a solid color. The transparency of the graphic element 202*f* permits continued presentation of the conventional weather information. Any suitable degree of transparency may be used so that portions of both the presented graphic element 202*f* and the presented weather reflectivity information of the corresponding area are concurrently visible on the display 102. Some embodiments may adjust the level of transparency to impart information about the associated convective weather. For example, transparency levels may be decreased (thus making the graphic element 202*f* more readily discernable to the crew) to indicate increasing levels of severity of the convective weather of interest. Increasing intensity and/or faster flashing rates may be associated with increasing levels of severity of the convective weather. Any suitable color may be used for the graphic element 202*f*.

Figure 2G:
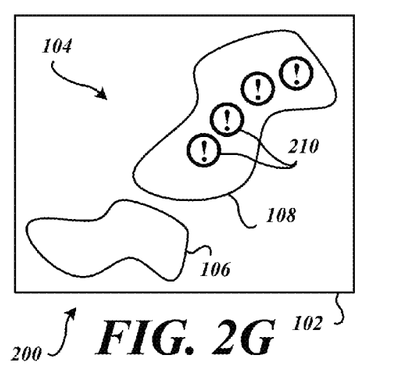

FIG. 2G illustrates an example embodiment that presents the unique graphic elements 210 using a plurality of different unique icons. The smaller size of the graphic elements 210 permits continued presentation of the conventional weather information. Any graphic icon may be used to represent the graphic elements 210, illustrated as an exclamation point in a circle in FIG. 2G. Some embodiments may adjust the size of the graphic element 210 and/or the font characteristics (bold and/or italics) to impart information about the associated convective weather. For example, the size of the graphic element 210 may be increased (thus making the graphic elements 210 more readily discernable to the crew) to indicate increasing levels of severity of the convective weather of interest. Increasing intensity and/or faster flashing rates may be associated with increasing levels of severity of the convective weather. Any suitable color may be used for the graphic elements 210.

Figure 2H:
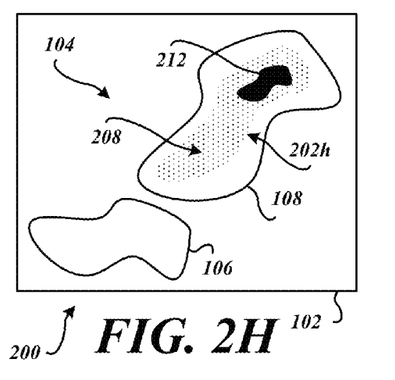

FIG. 2H illustrates an example embodiment that presents a plurality of different graphic elements in the presented unique graphic element 202*h*. The different number and/or types of different graphic elements may be used to impart a range of information about the associated convective weather. For example, the graphic element 202*h* employs the pattern 208 of dots and solid colored graphic element 212. The pattern 208 of dots may indicate relatively less severe levels of the convective weather. In contrast, the solid colored graphic element 212 may be used to indicate an increasing level of severity of the convective weather of interest.

Figure 2I:
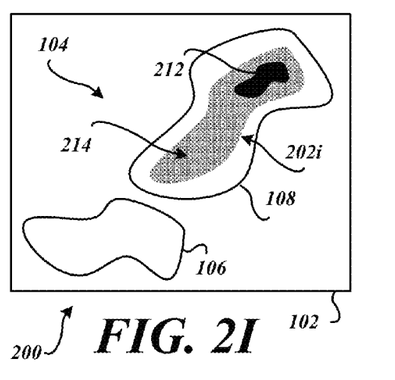

FIG. 2I illustrates an example embodiment that presents a plurality of different solid colored graphic elements 212, 214 in the presented unique graphic element 202*i*. The number and/or colors of the different graphic elements 212, 214 may be used to impart information about the associated convective weather. For example, the graphic element 212 employs the color that is darker than the solid colored graphic element 214. Thus, the graphic element 214 may indicate relatively less severe levels of the convective weather, and in contrast, the solid colored graphic element 212 may be used to indicate an increasing levels of severity of the convective weather of interest. Increasing intensity and/or faster flashing rates may be associated with increasing levels of severity of the convective weather. Any suitable color and/or degree of transparency may be used for the graphic elements 212, 214.

Figure 2J:
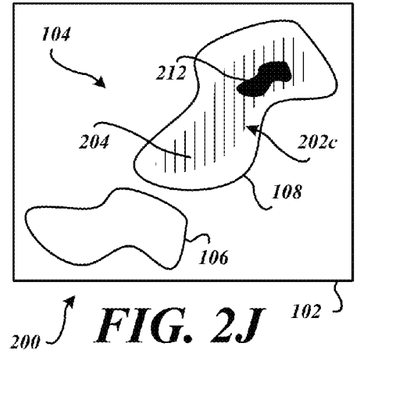

FIG. 2J illustrates another example embodiment that presents a plurality of different graphic elements in the presented unique graphic element 202*j*. The number and/or types of different graphic elements may be used to impart information about the associated convective weather. For example, the graphic element 202*j* employs the pattern 204 of lines and the solid colored graphic element 212. The pattern 204 of lines may indicate relatively less severe levels of the convective weather, and in contrast, the solid colored graphic element 212 may be used to indicate an increasing levels of severity of the convective weather of interest. However, in contrast to the pattern 208 of dots of FIG. 2H, the pattern 204 of lines may be predefined to indicate an increasing level of severity of the convective weather of interest that is greater than the level of severity associated with the pattern 208 of dots used in FIG. 2H. Thus, if the presented display transitions from FIG. 2H to FIG. 2J, the crew may understand that the changed form the pattern 208 of dots to the pattern 204 of lines may indicate an increasing level of severity of the convective weather of interest.

Figure 2K:
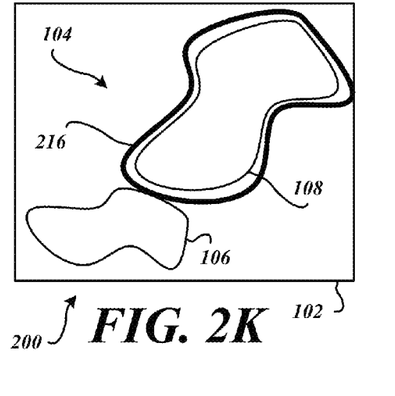
Figure 3:
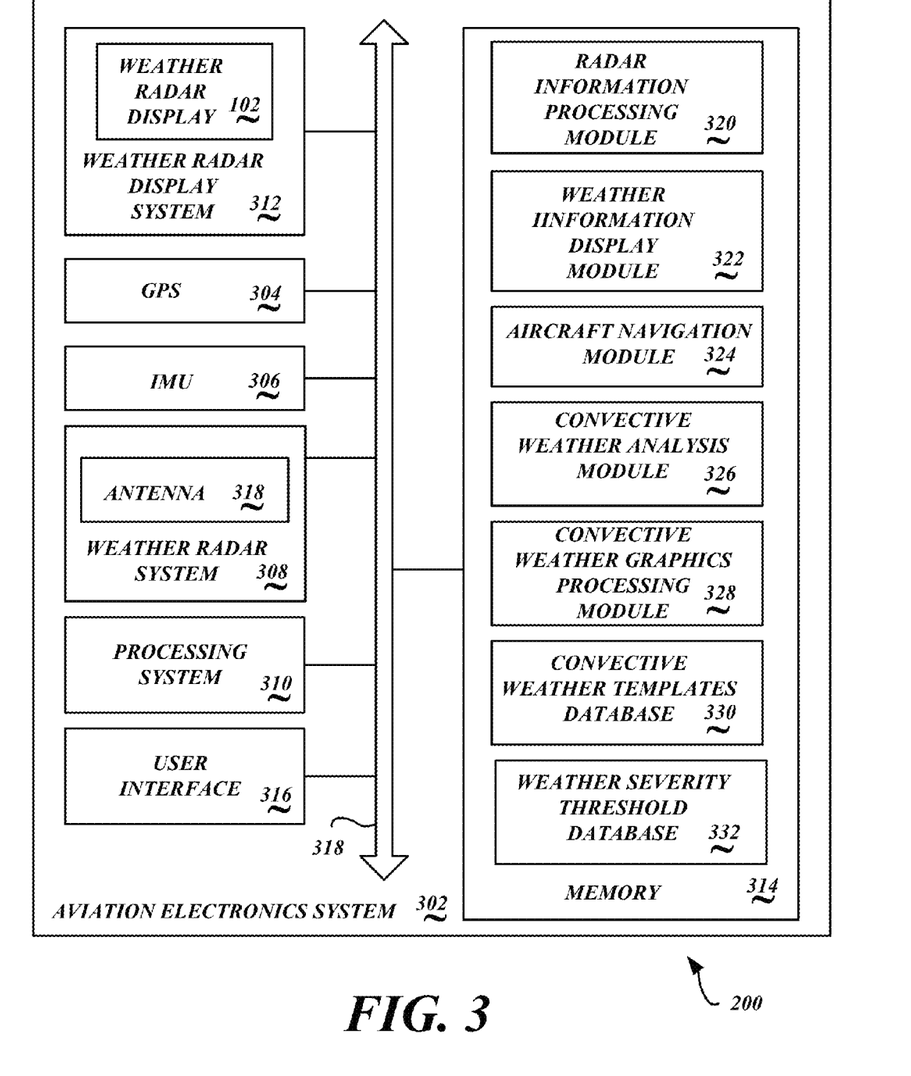
FIG. 3 is a block diagram of an exemplary embodiment of an aircraft location system implemented in an aviation electronics system of an aircraft.

FIG. 2K illustrates an example embodiment that presents a boundary line 216 that encompasses the entirety of the second weather cell 108. With this embodiment, weather cells that are indicated a potential of having convective weather therein are bounded by the boundary line 216. Other weather cells, such as the stratiform weather type of weather cell graphic element 106 that do not have convective weather therein, are not bounded by a boundary line 216. Increasing intensity and/or faster flashing rates, and/or a specific color, of the boundary line 216 may be associated with increasing levels of severity of the convective weather FIG. 3 is a block diagram of an exemplary embodiment of an aircraft location system 200 implemented in an aviation electronics system 302 of an aircraft. The exemplary aviation electronics system 302 includes an optional global positioning system (GPS) 304, an optional inertial measurement unit (IMU) and/or instrument navigation system (INS) 306, a weather radar system 308, a processing system 310, a weather radar display system 312, a memory 314, and an optional user interface 316. The radar system 308 includes an antenna 318 that is operable to emit radar signals and receive radar returns. The weather radar display system 312 includes the weather radar display 102. It is appreciated that the aviation electronics system 302 includes many other components and/or systems that are not illustrated or described herein.

The above-described components, in an exemplary embodiment, are communicatively coupled together via a communication bus 318. In alternative embodiments of the aviation electronics system 302, the above-described components may be communicatively coupled to each other in a different manner. For example, one or more of the above-described components may be directly coupled to the processing system 310, or may be coupled to the processing system 310 via intermediary components (not shown).

The weather radar system 308 may be any suitable radar system, such as, but not limited to, a weather radar system that is operable to detect weather that is located relatively far away from the aircraft. The weather radar system 308 may be very accurate in determining information from the radar returns from sensed weather. In an example embodiment, the weather radar system 308 is configured to sense sufficient weather radar return information for determination of a volume of water in a given three dimensional (3-D) region of airspace.

The antenna 318 is operable to emit radar pulses and to receive radar returns. A radar return is reflected energy from an object upon which the emitted radar pulse is incident. The antenna 318 is swept in a back-and-forth motion, and optionally in an up and down direction, and/or optionally in other directions of interest, such that the weather radar system 308 is able to scan an airspace region of interest in proximity to the aircraft.

An exemplary embodiment of the convective weather graphic element generator 200 comprises a plurality of cooperatively acting modules. In an exemplary embodiment, the modules are identified as a radar information processing module 320, a weather information display module 322, an aircraft navigation module 324, a convective weather analysis module 326, and a convective weather graphics processing module 328. Memory 314 may also include a convective weather templates database 330 and a weather severity threshold database 332. The convective weather templates database 330 comprises a plurality of different predefined graphical templates which are used to render the above-described graphic elements. The weather severity threshold database 332 includes a plurality of weather severity threshold values associated with different severities of convective weather. More particularly, the weather severity thresholds are expressed as an amount of a summation of reflectivity values in a column of airspace. Modules 320, 322, 324, 326, 328 and databases 330, 332 reside in the memory 314, and are retrieved and/or executed by the processing system 310. In other embodiments, the modules 320, 322, 324, 326, 328 and/or databases 330, 332 may be implemented together as a common module and/or database, may be integrated into other modules and/or databases, or reside in other memories (not shown). Further, the data databases 330 and/or 332 may be implemented in various formats, such as a buffer or the like, and/or may be implemented in another memory.

The GPS 304 determines the current location of the aircraft. The IMU 306 may also be used to determine the current location and/or altitude, or supplement determination of the current location and/or altitude, of the aircraft. Information determined by the GPS 304 and/or the IMU 306 is used to determine presentation location of identified weather, and more particularly the presentation of the graphical elements, relative to the location of the aircraft.

The user interface 316 receives input from the crew of the aircraft. Accordingly, the crew may optionally elect to view only radar information detected by the weather radar system 308 (conventional weather radar information), to view only the unique graphic elements determined by embodiments of the convective weather graphic element generator 200, or to view a combination of both conventional weather radar information and graphic elements.

The radar information processing module 320 processes radar returns detected by the antenna 318 of the weather radar system 308 into weather information. Weather radar returns may be associated with various types of weather, such as convective weather and stratiform weather. The radar information processing module 320 may determine the type of detected weather, and their associated attributes such as location, vertical extent, water content, and/or severity. The location, extent, and severity levels of the convective weather detected are determined with respect to the current location of the aircraft. The determined weather information is saved into the corresponding bins (2-D) or voxels (3-D) in the memory 314 or another memory medium.

The weather information display module 322 accesses the stored weather information and constructs a displayable image corresponding to a graphical presentation of the conventional weather information. The displayable image of the weather information is communicated to the weather radar display system 312. The weather radar display system 312 renders the weather information into graphical information that presented on the display 102. The displayable image, in some embodiments, is in the form of bit map data.

The convective weather graphics processing module 328 also processes the received weather radar information to determine the location, extent, water content, and severity levels of convective weather detected by the weather radar system 308. Alternatively, this information may be received from the radar information processing module 320. The processed convective weather information may be saved into the memory 314 and/or saved into another suitable memory or buffer.

In an example embodiment, the level of severity of convective weather is based on a value of vertically integrated reflectivity (VIR). The process is described in greater detail in commonly assigned U.S. Pat. No. 8,068,050, which is incorporated herein in its entirety. In such embodiments, three-dimensional distribution of radar reflectivity of weather is obtained using the weather radar system 308. The magnitude of the returned reflectivity information correlates to an amount of water content. Integrations of the reflectivity in vertical columns are performed for a 3-D region of airspace, and the integrations determine the water volume content (also referred to as a value of vertically integrated reflectivity, or VIR), in a column of airspace or some other volume of interest. The resulting VIR value provides an estimated measure of water content in the convective weather.

When a large region of airspace is evaluated, some regions may have no significant VIR values, such as in clear airspace and/or in stratiform weather. Other regions of airspace may have significant VIR values, such as in convective weather. The VIR values that exceed a weather severity threshold can be used to identify regions of airspace for which the unique graphic elements should be generated and then presented on the weather radar display 102.

The extent, or boundary, of a region of airspace having a VIR value above a threshold can be determined in a variety of manners. In an example embodiment, a column of airspace having a VIR level that is below the threshold and an adjacent column of airspace having a VIR level above a threshold may be used to identify the extent of a region of airspace for which a unique graphic element should be presented.

The transition, or extent, of a region of airspace form which graphic elements should be indicated may be based on a range of thresholds of VIR levels. For example, a first VIR threshold may be used to identify regions of clear airspace and/or stratiform weather. If the VIR level is above that threshold, then the region may be identified as convective weather. If the VIR level exceeds another higher threshold, then the unique graphical elements are generated and presented on the weather radar display 102.

Alternatively, or additionally, the transition, or extent, may be based on a minimum region size where multiple transition regions may be identified based on columns of airspace having different VIR levels. Here, an example embodiment requires a predefined number of adjacent columns of airspace having VIR levels that exceed the threshold before a region of airspace for which a unique graphic element should be presented is identified.

Further, a region of airspace for which a unique graphic element should be presented may itself have to be at least equal to some minimum size threshold. Thus, only relatively large 3-D regions of convective weather having column VIR levels over the threshold would have their unique graphic elements presented on the weather radar display 102, while smaller regions would not have unique graphic elements presented (thereby reducing clutter on the weather radar display 102).

The convective weather analysis module 326 also determines which particular unique graphic elements should be indicated to the crew of the aircraft. Weather severity thresholds stored in the weather severity threshold database 332 are compared with determined convective weather severity levels. If a particular 3-D region of airspace exhibits a convective weather severity level that exceeds a particular one of the weather severity thresholds, then the convective weather graphic element generator 200 will generate a suitable unique graphic element (depending upon if the display feature has been activated by the crew via the user interface 316) using an associated one of the unique graphic elements that is presented on the weather radar display 102.

The convective weather templates database 330 comprises a plurality of various graphical templates. For example, the solid colored graphic element 202a (FIG. 2A) is generated by retrieving the corresponding solid color template for that unique graphic element from the convective weather templates database 330. The convective weather graphics processing module 328, based on the determined extent of the associated convective weather, and the relative location of the convective weather from the aircraft, would use that particular template to generate the graphic element 202a that is presented on the weather radar display 102.

As another example, if the severity level of the detected convective weather is to be shown using the pattern 208 of dots (FIGS. 2D, 2E, 2H), a series of dots would be retrieved from the convective weather templates database 330. In some embodiments, the color, intensity, and/or flashing rate of the presented dots would be adjusted by the convective weather graphics processing module 328 after the pattern of dots is retrieved from the convective weather templates database 330.

In other embodiments, the convective weather templates database 330 may comprise a plurality of different pattern of dot graphics, each with different colors, intensities, and/or flash rates. Here, the convective weather graphics processing module 328 would simply retrieve the particular dot pattern graphic of interest from the convective weather templates database 330 (based on the analysis of the severity level of the convective weather).

In an example embodiment, the crew of the aircraft may define which of the unique graphic elements that they wish to have presented when particular levels of convective weather are identified by the convective weather graphics processing module 328. Further, the crew may optionally specify particular values for the weather severity thresholds stored in the weather severity threshold database 332. For example, a crew of a relatively large cargo or passenger aircraft may have a predefined set of weather severity thresholds that are quite different from the weather severity thresholds set be the pilot of a small single engine aircraft. Crew selection may be made via the user interface 316, wherein the input data is managed and stored by the convective weather analysis module 326.

Alternatively, or additionally, the various weather severity thresholds may be predefined and stored in the weather severity threshold database 332 by another entity, such as a manufacturer of the aircraft and/or by a regulatory agency responsible for aircraft safety. Here, the convective weather severity levels may be hard-coded into the weather severity threshold database 332. Further, presentation of certain ones of the unique graphic elements may be mandated by the manufacturer and/or regulatory agency such that the crew may not selectively deactivate operation of all of, or at least a portion of, the convective weather graphic element generator 200.

In the various embodiments, any suitable metric of interest associated with convective weather may be used to identify regions of airspace that would have their unique graphic elements presented to indicate convective weather regions in a convective weather cell that are likely to have relatively high levels of water therein. The uniqueness of the various embodiments of the convective weather graphic element generator 200 is realized from the manner in which the determined graphical information is presented to the crew of the aircraft. Embodiments of the convective weather graphic element generator 200 go well beyond mere presentation of one or more graphical icons on the weather radar display 102. Here, some of the unique graphic elements superimposed over the conventional radar reflectivity information permits concurrent viewing of both the unique graphic element and the underlying conventional radar reflectivity information (such as the spaced-apart lines, dots, and/or transparency elements). The use of the boundary lines 206, 216 (FIGS. 2B, 2D and 2K) in conjunction with an interior pattern permits the crew to more readily identify regions of convective weather that may have high levels of water content while still viewing the conventional radar reflectivity information. Further, transitioning over time from one type of unique graphic element to another type of unique graphic element, or concurrently presenting multiple different types of unique graphic elements, provides a dynamic way to indicate to the crew changing conditions in convective weather as a function of distance (location) and time (such as when the extents of a presented unique graphic element changes, and/or when the type of presented unique graphic element changes).

Some aircraft may have a flight plan processing module (not shown) or the like. The optional flight plan processing module processes flight plan information. Flight plans may be predefined and/or entered by the crew. A predefined flight plan typically comprises a plurality of planned flight path segments based upon a series of waypoints. The flight plan information includes geographic location information that defines location of waypoints and/or the flight path segments, and/or planned altitude information. Accordingly, the flight plan may be used to determine regions of space where it is difficult to distinguish weather severity levels from weather radar returns, or that is beyond the detection range of the weather radar system 308.

In an example embodiment, the determined regions of space associated with the flight plan are then used to filter, or otherwise select, the regions that are monitored for convective weather that lies along the planned flight path. If convective weather with a severity level that exceeds a weather severity threshold is identified along the flight path, or in proximity to the flight path, one or more of the unique graphic elements would then be presented on the weather radar display 102. Convective weather with a severity that exceeds the weather severity threshold is not along, or in proximity to, the flight path may not have their respective unique graphic elements presented on the weather radar display 102 so as to reduce visible clutter on the weather radar display 102.

In some embodiments, the crew, via input provided through the user interface 316, may elect to have all unique graphic elements presented for the entirety of the region of airspace currently displayed on the weather radar display 102 (rather than limiting presentation of the unique graphic elements along the flight plan or path). In some embodiments, the crew may input alternative flight plans or paths, and if convective weather with a severity that exceeds a weather severity threshold is identified along the alternative flight path, then unique graphic elements could be presented for the convective weather that lies along the new planned flight path. These features would assist the crew in identifying alternate routes around particularly severe regions of convective weather. The presented unique graphic elements would help the crew to quickly identify other regions of airspace with heavy levels of convective weather that should also be avoided, or to at least identify less severe areas of convective weather to fly through.

In some embodiments, weather information may alternatively, or additionally, be presented on another display, such as a display of an electronic flight bag (EFB). Such displays would receive the weather information from the weather radar system 308. In such devices, an embodiment of the convective weather graphic element generator 200 may be included so that unique graphic elements associated with severe levels of convective weather may be presented on the display. In a ground based weather radar system, where radar information is received from remote aircraft and/or ground based radars, an embodiment of the convective weather graphic element generator 200 may be included so that unique graphic elements associated with severe levels of convective weather may be presented on the display located at the ground station.

In some embodiments, weather radar information may be received from other aircraft. If the received weather information has sufficient data to determine severity levels of the convective weather detected by the remote aircraft, embodiments may be configured to present one or more of the unique graphic elements for the weather radar information received from the remote aircraft. Further, if the aircraft is providing weather information to other remote aircraft, the information provided to the other aircraft may include the unique graphic elements and/or severity level information that may be used by remote aircraft provisioned with their own convective weather graphic element generator 200.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A convective weather graphic element generator system comprising:
  a weather radar configured to receive weather radar returns from convective weather and stratiform weather in proximity to the aircraft, and configured to generate weather reflectivity information;
  a processing system configured to:
    detect a convective weather cell based on the weather reflectivity information;
    determine a value associated with the detected convective weather cell based on the received weather radar returns,
    compare the value associated with the detected convective weather cell with a threshold, and
    generate a graphic element indicating a region of airspace within the detected convective weather cell, wherein the region of airspace has its respective value associated with the detected convective weather cell exceeding the threshold; and
  a display configured to concurrently present the weather reflectivity information generated by the weather radar and the graphic element associated with the convective weather cell,
  wherein the weather reflectivity information is presented on the display to indicate the location of the convective weather cell and the stratiform weather,
  wherein the graphic element is superimposed over the weather reflectivity information of a corresponding area, and
  wherein portions of both the presented graphic element and the presented weather reflectivity information of the corresponding area are concurrently visible on the display.

2. The system of claim 1, wherein the graphic element comprises a pattern of lines.

3. The system of claim 2, wherein the pattern of lines is bounded by a boundary line, wherein the boundary line defines the extent of the convective weather cell having a value exceeding the threshold.

4. The system of claim 2, wherein an intensity of the presented pattern of lines corresponds to the severity of the convective weather cell, wherein an increasing intensity indicates an increasing severity of the convective weather cell.

5. The system of claim 2, wherein a thickness of the presented pattern of lines corresponds to the severity of the convective weather cell, wherein an increasing thickness indicates an increasing severity of the convective weather cell.

6. The system of claim 2, wherein a rate of flashing of the presented pattern of lines corresponds to the severity of the convective weather cell, wherein a faster flashing rate indicates an increasing severity of the convective weather cell.

7. The system of claim 1, wherein the graphic element comprises a pattern of dots.

8. The system of claim 7, wherein the pattern of dots is bounded by a boundary line, wherein the boundary line defines the extent of the convective weather cell having a value exceeding the threshold.

9. The system of claim 8, wherein a thickness of the boundary line corresponds to the severity of the convective weather cell, wherein an increasing thickness of the boundary indicates an increasing severity of the convective weather cell.

10. The system of claim 7, wherein an intensity of the presented pattern of dots corresponds to the severity of the convective weather cell, wherein an increasing intensity indicates an increasing severity of the convective weather cell.

11. The system of claim 7, wherein a size of the presented dots corresponds to the severity of the convective weather cell, wherein an increasing dot size indicates an increasing severity of the convective weather cell.

12. The system of claim 7, wherein a rate of flashing of the presented dots corresponds to the severity of the convective weather cell, wherein a faster flashing rate indicates an increasing severity of the convective weather cell.

13. The system of claim 1, wherein the graphic element comprises a region of solid color with a degree of transparency, such that the transparency of the graphic element permits concurrent viewing of the presented weather reflectivity information.

14. The system of claim 13, wherein a rate of flashing of the region of solid color corresponds to the severity of the convective weather cell, wherein a faster flashing rate indicates an increasing severity of the convective weather cell.

15. The system of claim 13, wherein an intensity of the color of the region of solid color corresponds to the severity of the convective weather cell, wherein an increasing intensity of the color indicates an increasing severity of the convective weather cell.

16. The system of claim 1, wherein the threshold is a first threshold, the graphic element is a first graphic element, and wherein the processing system is further configured to:
   compare the value associated with the detected convective weather cell with a second threshold; and
      generate one of the first graphic element or a second graphic element based on the comparison,
      wherein the processing system is configured to generate the first graphic element for the region of airspace in response to its respective value associated with the detected convective weather cell exceeding the first threshold and not exceeding the second threshold, and
      wherein the processing system is configured to generate the second graphic element for the region of airspace in response to its respective value associated with the detected convective weather cell exceeding the second threshold.

17. The system of claim 16, wherein the first graphic element is a pattern of dots and the second graphic element is a pattern of lines, and wherein the value of the pattern of lines is greater than the value of the pattern of dots such that the severity of the convective weather cell shown by the region of the pattern of lines is greater than the severity of the convective weather cell shown by the region of the pattern of dots.

18. The system of claim 16, wherein the first graphic element is a pattern of dots and the second graphic element is a region of solid color, and wherein the value of the solid color is greater than the value of the pattern of dots such that the severity of the convective weather cell shown by the region of solid color is greater than the severity of the convective weather cell shown by the region of the pattern of dots.

19. A method of presenting convective weather graphic elements on a display of a weather radar system implemented on an aircraft, the method comprising:
   detecting weather radar returns from convective weather and stratiform weather in proximity to the aircraft;
   generating weather reflectivity information based on the detected weather radar returns; determining a value associated with the detected convective weather based on the received weather radar returns;
   detecting a convective weather cell based on the weather reflectivity information;
   comparing the value associated with the detected convective weather with a threshold;
   generating a graphic element indicating a region of airspace within the convective weather cell, wherein the region of airspace has its respective value associated with the detected convective weather exceeding the threshold; and
   concurrently presenting the weather reflectivity information generated by the weather radar and the graphic element associated with the convective weather cell,
   wherein the weather reflectivity information is presented on the display to indicate the location of the convective weather cell and the stratiform weather,
   wherein the graphic element is superimposed over the weather reflectivity information of a corresponding area, and
   wherein portions of both the presented graphic element and the presented weather reflectivity information of the corresponding area are concurrently visible on the display.

20. The method of claim 19, wherein the threshold is a first threshold, the graphic element is a first graphic element, and further comprising:
   comparing the value associated with the detected convective weather cell with a second threshold; and
      generating one of the first graphic element or a second graphic element based on the comparison,
      wherein the first graphic element for the region of airspace is generated in response to its respective value associated with the detected convective weather cell exceeding the first threshold and not exceeding the second threshold, and
      wherein the second graphic element for the region of airspace is generated in response to its respective value associated with the detected convective weather cell exceeding the second threshold.

* * * * *